United States Patent
Schweitzer et al.

(10) Patent No.: US 6,412,985 B1
(45) Date of Patent: Jul. 2, 2002

(54) FLANGED RING FOR FIXING A BEARING IN PLACE

(75) Inventors: Ferdinand Schweitzer, St. Peter; Robert Pollmann, Karlstein, both of (AT)

(73) Assignee: SKF GmbH, Schweinfurt (DE)

( * ) Notice: Subject to any disclaimer, the term of this patent is extended or adjusted under 35 U.S.C. 154(b) by 0 days.

(21) Appl. No.: 09/662,545

(22) Filed: Sep. 15, 2000

(30) Foreign Application Priority Data

Sep. 16, 1999 (DE) ..................... 299 16 349 U

(51) Int. Cl.⁷ ............................................. F16C 35/00
(52) U.S. Cl. ................. 384/585; 384/537; 384/561; 384/903
(58) Field of Search ................. 384/903, 537, 384/539, 561, 570, 584, 585; 403/326, 329; 411/539, 540, 541; 24/20 CW, 20 C, 615

(56) References Cited

U.S. PATENT DOCUMENTS

| | | | | |
|---|---|---|---|---|
| 1,344,194 A | * | 6/1920 | Wright | 411/540 |
| 1,597,525 A | * | 8/1926 | Knake | 411/540 |
| 2,136,125 A | * | 11/1938 | Delaval-Crow | 384/903 |
| 2,476,586 A | * | 7/1949 | Darash | 384/539 |
| 3,738,720 A | * | 6/1973 | Loehle | 384/537 |
| 3,888,597 A | | 6/1975 | Datta | 403/326 |
| 4,511,191 A | * | 4/1985 | Kitamura | 384/536 |

FOREIGN PATENT DOCUMENTS

DE 7330413 8/1973

* cited by examiner

Primary Examiner—Thomas R. Hannon
(74) Attorney, Agent, or Firm—Burns, Doane, Swecker & Mathis, L.L.P.

(57) ABSTRACT

A flanged ring for fixing a bearing in place at least axially with respect to a machine component is in the form of a ring-shaped sheet metal element provided with a break at least at one place on the circumference of the annular metal element. The break defines two adjacently positioned end regions of the annular metal element and these end regions are adapted to be permanently connected to one another by way of an interlocking connection. The interlocking connection can be constituted by a portion of one end region extending towards or being punched out towards the other end region. Alternatively, the interlocking connection can be provided by a connecting element (e.g., a rivet) that extends through a bore in each of the end regions.

17 Claims, 2 Drawing Sheets

FLANGED RING FOR FIXING A BEARING IN PLACE

This application is based on and claims priority under 35 U.S.C. §119 with respect to German Application No. Gbm 299 16 349.0 filed on Sep. 16, 1999, the entire content of which is incorporated herein by reference.

FIELD OF THE INVENTION

This invention generally relates to bearings. More particularly, the present invention pertains to a flanged ring for fixing a bearing in place, particularly a rolling bearing in a machine component, in which one side of the ring engages a groove at the outer or inner circumference of the bearing and the other side of the ring engages a groove or recess in a housing or a shaft to thereby fix the bearing in place at least axially and preferably also radially with respect to the machine component.

BACKGROUND OF THE INVENTION

Flanged rings for fixing a bearing in place are known. A known type of flanged ring which fixes a rolling bearing in place in a housing is described in DE 73 30 413 U1. The housing is provided with a groove for purposes of fixing the rolling bearing in place. The diameter of the flanged ring essentially corresponds to the outer diameter of the outer ring. The flanged ring is placed into the housing bore and displaced with one side into the groove so that it is eccentrically arranged with respect to the center of the bearing. The ring is fixed in place in this position.

This construction is disadvantageous in that, because of its construction and intended manner usage, the flanged ring cannot transmit forces over the entire circumference.

Another type of flanged ring is described in FR 2 173 605. The flanged ring described in this document does not suffer from the particular disadvantage mentioned above. This document describes an expandable ring that is employed as a flanged ring. After appropriate deformation, the flanged ring is inserted into the groove of the housing and is firmly seated there after the expansion force is released. In addition, a second expandable ring is provided which forms an interlocking connection between the rolling bearing and the housing so that the bearing is axially fixed in the housing. However, this flanged ring construction suffers from the disadvantage that it can only be fixed by the spring force in the housing and cannot be further secured. Also, the structure of this flanged ring is relatively elaborate and expensive.

In light of the foregoing, a need exists for a flanged ring for fixing a bearing in place that is not as susceptible of the same disadvantages discussed above.

It would thus be desirable to provide a flanged ring that is relatively simple in structure and relatively easy to install.

A need also exists for a flanged ring that is able to provide a substantially perfect fixation in the axial direction, and preferably also in the radial direction, over the entire circumference of the bearing.

SUMMARY OF THE INVENTION

The present invention provides a flanged ring for fixing a bearing in place at least axially with respect to a machine component. The flanged ring is preferably in the form of a ring-shaped or annular sheet metal element provided with a break at least at one place on the circumference of the annular metal element. The break defines two adjacently positioned end regions of the annular metal element and these end regions are adapted to be permanently connected to one another by way of an interlocking connection.

The interlocking connection can be produced in a variety of ways. For instance, the interlocking connection can be created by punching, wherein one portion of one end region of the sheet metal element is pressed towards or into the other end region of the sheet metal element. Alternatively, the interlocking connection can be achieved by providing an axially extending bore in both end regions of the sheet metal element and at least one connecting element extending through the respective bores. In this case the connecting element can be a rivet, which can be at least partially countersunk in the sheet metal element. The flanged ring can be provided with breaks at two places along the circumference of the flanged ring, with the breaks being spaced apart or offset by 180°. In addition, one of the end regions of the flanged ring can be provided with a crimped portion.

With the flanged ring construction in accordance with the present invention, disadvantages similar to those associated with other known constructions such as those described above can be substantially avoided. Quite advantageously, the flanged ring according to the present invention is simple to manufacture as it requires few parts, possibly even one part. The mounting of the flanged ring can be rather easily accomplished because of the break in the ring at least at one location. Further, by virtue of the interlocked connection of the ring in the installed state, for example by way of punching or through use of a rivet, a clean fixation of the bearing over the entire circumference can be achieved. Unlike a flanged ring inserted only by expansion, jumping out of the flanged ring of the present invention is not likely to occur.

The present invention also provides the combination of a rolling bearing and a flanged ring for fixing the rolling bearing in place at least axially with respect to a machine component. The rolling bearing includes a groove in which is positioned the flanged ring, and the flanged ring is constituted by two separate metal parts each possessing a pair of end regions. Each end region of one metal part overlaps a respective one of the end regions of the other metal part, with the respective overlapping end regions of the metal parts being permanently connected to one another by an interlocking connection.

Another aspect of the present invention involves a bearing in combination with a flanged ring for fixing the bearing in place at least axially with respect to a machine component. The bearing possesses a groove in which is positioned the flanged ring. The flanged ring is annularly shaped and is provided with at least one break along a circumferential extent of the flanged ring so that the flanged ring possesses two end regions. The two end regions of the flanged ring are permanently connected to one another.

BRIEF DESCRIPTION OF THE DRAWING FIGURES

The foregoing and additional features and characteristics associated with the present invention will become more apparent from the following detailed description considered with reference to the accompanying drawing figures in which like elements are designated by like reference numerals and wherein.

DETAILED DESCRIPTION OF THE INVENTION

Figure 1:
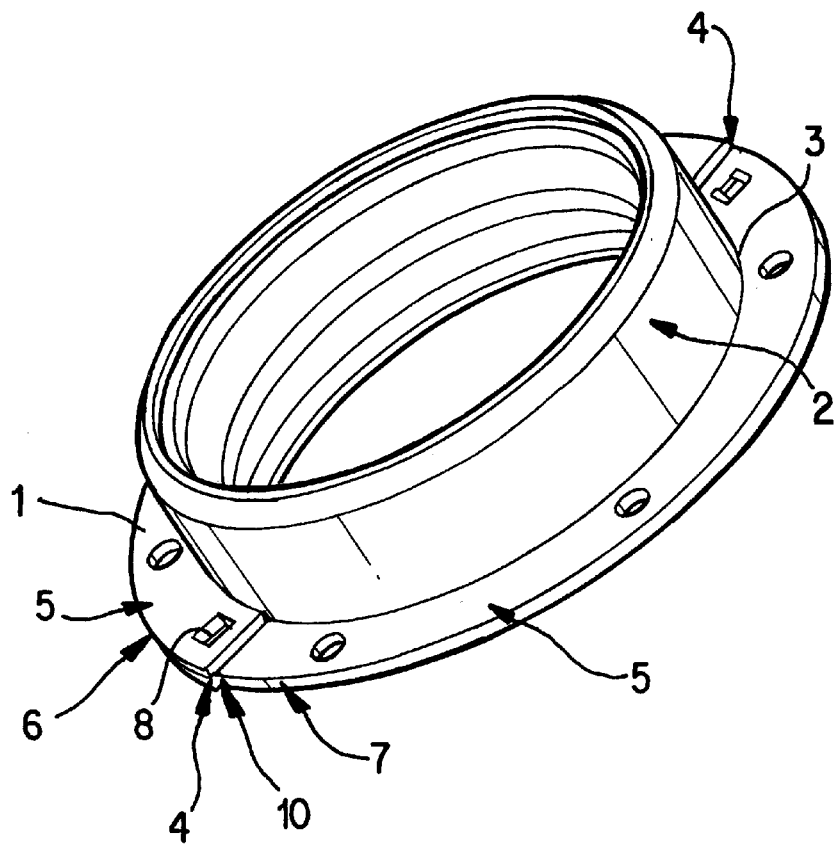
FIG. 1 is a top perspective view of a rolling bearing around which is located the flanged ring in accordance with the present invention.
Figure 3:
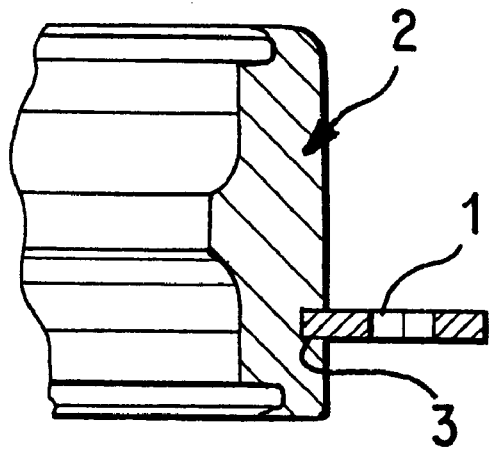
FIG. 3 is a cross-sectional view through the outer ring of the rolling bearing with the flanged ring in engagement.

FIG. 1 illustrates a rolling bearing 2 that is adapted to be fixed in place axially, and preferably also radially, within a housing. The rolling bearing 2 is thus outfitted with a flanged ring 1 for this purpose. The flanged ring 1 is generally annularly shaped and can be formed from metal, for example sheet metal. As best illustrated in FIG. 3, the flanged ring 1 engages a groove 3 that is formed in the outer circumferential surface of the outer ring of the bearing 2.

The flanged ring 1 is provided with a break 4 at least at one location along its circumferential extent to thus form a split flanged ring 1. The flanged ring 1 thus possesses two separate end regions 6, 7 that generally adjoin and meet one another at the location of the break 4 in the ring.

Figure 2:
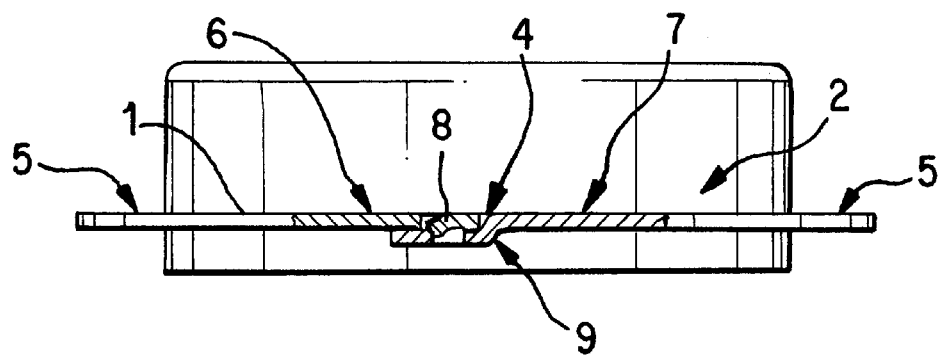
FIG. 2 is a side view of a portion of the flanged ring at its connecting point.

To permit the flanged ring 1 to be cleanly positioned and fixed in place in the groove 3 of the bearing 2, the flanged ring is designed so that in the mounted state, the end regions 6, 7 of the flanged ring at the position of the break 4 in the flanged ring 1 are connected by way of an interlocking connection 10, for example by punching or through the use of a rivet. To permit this interlocking connection to be relatively easily accomplished, one end region 7 of the flanged ring 1 is provided with a crimped portion 9 as best illustrated in FIG. 2. This crimped portion 9 defines an axial offset in the portion of the flanged ring adjacent the break 4. The axial offset is generally equal to thickness of the flanged ring 1. Thus, at the location of the break 4 in the flanged ring, the ends of the split flanged ring 1 located adjacent the break 4 overlap one another as seen particularly well in FIG. 2 so that the crimped portion 9 lies in a plane different from and generally parallel to the remainder of the flanged ring 1.

A construction of the flanged ring 1 which has been found to be relatively easy to mount and yet is very stable is a construction in which the flanged ring 1 consists of two separate parts or sheet metal parts 5, 5. Thus, as shown in FIG. 1, the flanged ring 1 is provided with two breaks 4, 4 spaced apart approximately 180° from each other on diametrically opposite sides of the flanged ring to define the two separate sheet metal parts 5, 5. Thus, the breaks can be positioned so that each of the sheet metal parts 5 is generally in the form of a semi-circle encircling approximately one-half the outer circumference of the bearing 2. As generally shown in FIG. 1, when the flanged ring 1 is provided with such a pair of breaks so that the flanged ring 1 is defined by two separate sheet metal parts 5, 5, one of the end regions adjacent each of the breaks is provided with a crimped region similar to that shown in detail in FIG. 2 and described above. The two parts 5, 5 are thus respectively connected at their ends after being inserted into the groove 3. In an advantageous manner, the bearing can even be preassembled with an appropriately mounted flanged ring constructed in the manner described above. In this state, the bearing and the mounted flanged ring can be inserted into the housing bore. The axial fixation in place of the bearing can be achieved, for example, screwing on a housing cover from the outside following insertion of the bearing and the mounted flanged ring into the housing. This axially pushes on the flanged ring and fixes it in place.

As mentioned above, the flanged ring 1 can be cleanly positioned and fixed in place in the groove 3 of the bearing 2 by providing an interlocking connection at the end regions 6, 7 of the flanged ring positioned on either side of the break 4 in the flanged ring 1. This interlocking connection can take the form of a punched connection or a rivet connection. FIG. 2 illustrates the punched connection 8 in which a part of the one end region 6 of the flanged ring 1 is punched out into the area of the other end region 7. This can be very easily automated so that high manufacturing costs can be avoided. As can be seen in FIG. 2, a portion of the end region 6 of the sheet metal ring is punched out or deformed downwardly into the area of the underlying other end region 7, with the underlying end region 7 being provided with a hole that receives the downwardly deformed portion of the end region 6 in such a way that an interlocking connection of the two ends regions 6 and 7 is provided. In this way the flanged ring in unable to come loose during later operation.

Figure 4:
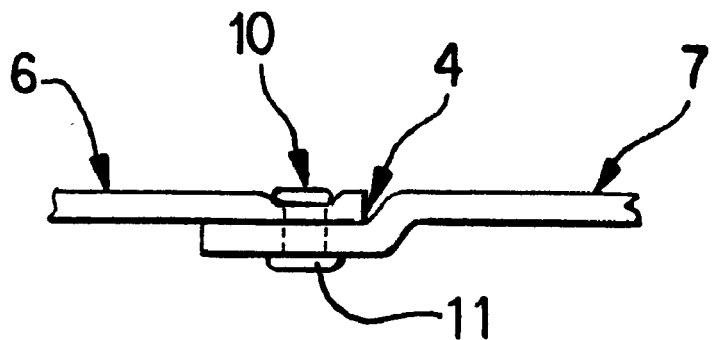
FIG. 4 is a side view of a portion of the end regions of the flanged ring according to the present invention illustrating a different interlocking connection for permanently connecting together the end regions.

FIG. 4 illustrates an alternative interlocking connection 10 for permanently connecting the two end regions 6, 7 of the flanged ring 1. Here, each of the ends regions 6, 7 is provided with an axially extending through bore. A connecting element 11 passes through the bore in each of the end regions 6, 7 of the flanged ring 1. In the illustrated embodiment, the connecting element is in the form of a rivet. As shown in FIG. 4, the connecting element is at least partially countersunk in the flanged ring 1.

When the flanged ring 1 is constructed with two breaks 4, 4 so that the flanged ring is constituted by two separate sheet metal parts 5, 5, an interlocking connection similar to that described above is provided to connect together the adjacent ends of both sheet metal parts 5, 5.

The flanged ring 1 can be advantageously manufactured in a relatively simple manner. For example, the flanged ring can be punched out of deep-drawn sheet metal, perforated and then bent, thus allowing the flanged ring 1 to be fabricated relatively rapidly and in a cost-effectively way in large numbers. As shown in FIG. 1, the flanged ring 1 is also provided with a plurality of holes for purposes of securement.

The principles, preferred embodiments and mode of operation of the present invention have been described in the foregoing specification. However, the invention which is intended to be protected is not to be construed as limited to the particular embodiments described. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. A rolling bearing in combination with a flanged ring for fixing the rolling bearing in place at least axially with respect to a machine component, the rolling bearing including a groove in which is positioned the flanged ring, the flanged ring being comprised of two separate metal parts each possessing a pair of end regions, each end region of one metal part overlapping a respective one of the end regions of the other metal part, the respective overlapping end regions of the metal parts being permanently connected to one another by an interlocking connection.

2. The combination according to claim 1, wherein each interlocking connection is formed by a portion of one of the end regions extending towards and engaging the respective other end region.

3. The combination according to claim 1, wherein each interlocking connection is formed by a portion of one of the end regions being punched out towards and engaging the respective other end region.

4. The combination according to claim 1, wherein each of the end regions is provided with an axially extending bore, and each interlocking connection is formed by a connecting element extending through the bore in each of the overlapping end regions.

5. The combination according to claim 4, wherein the connecting element is a rivet.

6. The combination according to claim 5, wherein the rivet is at least partially countersunk in the respective metal part.

7. The combination according to claim 1, wherein each of the metal parts is semi-circular in shape and the interlocking connections are spaced apart 180° from each other.

8. The combination according to claim 1, wherein at least one of the end regions of each metal part possesses a crimped portion.

9. A bearing in combination with a flanged ring for fixing the bearing in place at least axially with respect to a machine component, the bearing including a groove in which is positioned the flanged ring, the flanged ring being annularly shaped and provided with at least one break along a circumferential extent of the flanged ring so that the flanged ring possesses two end regions, said two end regions of the flanged ring being permanently connected to one another.

10. The combination according to claim 9, wherein the two end regions of the flanged ring are permanently connected to one another by way of a portion of one of the end regions extending towards and engaging the other end region.

11. The combination according to claim 10, wherein the portion of the one end region engages a hole provided in the other end region.

12. The combination according to claim 9, wherein the two end regions of the flanged ring are permanently connected to one another by way of a portion of one of the end regions being punched out towards and engaging the respective other end region.

13. The combination according to claim 9, wherein both of the end regions is provided with an axially extending bore, and the two end regions of the flanged ring are permanently connected to one another by way of a connecting element extending through the bore in each of the end regions.

14. The combination according to claim 13, wherein the connecting element is a rivet.

15. The combination according to claim 14, wherein the rivet is at least partially countersunk in the flanged ring.

16. The combination according to claim 9, wherein the flanged ring includes two breaks spaced apart 180° from each other.

17. The combination according to claim 9, wherein at least one of the end regions possesses a crimped portion.

* * * * *